US007000029B2

(12) United States Patent  
Marian et al.

(10) Patent No.: US 7,000,029 B2  
(45) Date of Patent: Feb. 14, 2006

(54) METHOD AND SYSTEM FOR AUTOMATIC ADDRESS ALLOCATION IN A NETWORK AND NETWORK PROTOCOL THEREFOR

(75) Inventors: Constantin Viorel Marian, Ottawa (CA); Dan Oprea, Ottawa (CA)

(73) Assignee: Tropic Networks Inc., Kanata (CA)

( * ) Notice: Subject to any disclaimer, the term of this patent is extended or adjusted under 35 U.S.C. 154(b) by 816 days.

(21) Appl. No.: 10/023,758

(22) Filed: Dec. 21, 2001

(65) Prior Publication Data

US 2003/0115303 A1    Jun. 19, 2003

Related U.S. Application Data

(60) Provisional application No. 60/318,315, filed on Sep. 12, 2001.

(51) Int. Cl.
    *G06F 15/13* (2006.01)
(52) U.S. Cl. ............... 709/245; 370/352; 370/522; 370/537
(58) Field of Classification Search .......... 709/245; 370/352, 522, 537
    See application file for complete search history.

(56) References Cited

U.S. PATENT DOCUMENTS

| 6,697,354 | B1 * | 2/2004 | Borella et al. | 370/352 |
| 6,763,040 | B1 * | 7/2004 | Hite et al. | 370/522 |
| 6,782,436 | B1 * | 8/2004 | Baker | 710/43 |
| 6,836,806 | B1 * | 12/2004 | Raciborski et al. | 709/245 |
| 2001/0007570 | A1 * | 7/2001 | Mangin | 370/537 |

OTHER PUBLICATIONS

Internet Protocol, Darpa Internet Program Protocol Specification, Sep. 1981, prepared for: Defense ADvanced Research Projects Agency prepared by: Information Sciences Institute, University of Southern California http://www.ietf.org/rfc/rfc0791.txt?number=791.

Retana, A., et al, Using 31-Bit Prefixes on IPv4 Point-to-Point Links, Dec. 2000. http://www.ietf.org/rfc/rfc3021/txt?number-3021.

IEEE Standard for Information Technology: Telecommunications and information exchange between systems Local and metropolitan area networks Part 2: Logical Link Control. ANSI/IEEE Std 802.2, 1998 edition.

* cited by examiner

*Primary Examiner*—John Follansbee  
*Assistant Examiner*—Jingsong Hu  
(74) *Attorney, Agent, or Firm*—Victoria Donnelly

(57) ABSTRACT

A method and system for automatic allocation of port addresses in a network is provided. The node performs a self-discovery after initial power-up, and for each port on the node, using unique values associated with the port in the network hierarchy, applies a function that allows for an inverse function to the set of values to generate a default unique address for the port. A typical hierarchical structure in a network is the network area, node, and, within the node, the shelf, the card and the port. Next, the node sends a frame including the default port address and node identifier, from the port to a connected node. The node polls the port for a frame with network information associated with the connected port on the other node. If a frame is received from the other node, the node applies a logical condition to the default and received port addresses, and, if the condition is satisfied, applies another function to the received port address to generate a new unique address for the port, and maintains the new port address within the node. The method is described for IP networks but can be equally applied to ATM or Frame Relay networks, and for any nodes that support Sub-network Access Protocol (SNAP).

20 Claims, 4 Drawing Sheets

METHOD AND SYSTEM FOR AUTOMATIC ADDRESS ALLOCATION IN A NETWORK AND NETWORK PROTOCOL THEREFOR

This application claims the benefit of Provisional Application No. 60/318,315, filed Sep. 12, 2001.

FIELD OF THE INVENTION

The invention relates to telecommunications networks, and in particular, to a method and system for automatic allocation of addresses in a network and a network protocol therefor.

BACKGROUND OF THE INVENTION

Communication between devices in a network is achieved by communicating data along a path created by connecting a number of intermediate communication devices. The devices are usually grouped into networks of interconnected sub-networks, themselves comprising other sub-networks.

The data exchange between two adjacent devices in the network is achieved by connecting a transmission media, such as copper wire or optical fiber, from a communication port on one device to a communication port on another device and sending the data between the devices in accordance with the addresses allocated to the ports of the devices on network nodes.

One way to perform the selection and allocation of addresses for communication ports on a node is for the network administrator to decide and allocate addresses manually. Creating a network of nodes with unique addresses requires specialized knowledge and planning time to ensure there are no conflicting addresses. The process of configuring each node with the associated addresses is a time-consuming and error-prone manual task.

Another way for allocating and distributing addresses in a network is for one device in the network to act as an address server. In this approach, a newly introduced node in the network requests and receives an address from the server according to a protocol used by the node and the address server. This approach has the advantage of eliminating the need for address management by the network administrator. However, this approach has a disadvantage of requiring installation and maintenance of additional hardware in the network and software on the server and on each network node, as well as the financial cost of the additional hardware and software. It also provides allocation of device addresses in a random order which is not convenient and/or suitable in many situations.

Yet another approach for allocation of a unique address for a network device is for nodes to generate their own addresses, based on information relevant to the node, e.g. linked to the node's unique hardware. In order to ensure that generated addresses are unique, an identifier specific to the node and recognized by the node is used as the basis for generating the node's addresses. For example, the Institute of Electrical and Electronic Engineers (IEEE) 802 Ethernet address commonly found in network interface cards could be used as a basis for allocation of the addresses. Usually, such a system is combined with a network address server to check the addresses assigned on different nodes and to avoid conflicts between the addresses. The disadvantages of this method are that it requires a specialized hardware on the node and may require the address server in the network, and the addresses generated by one node are not related to those generated by another node, and in this sense are arbitrary, which is not suitable for many situations in the management of telecommunications networks.

Therefore, there is a need in the industry for the development of an improved method for allocation of addresses to the devices in a communications network, which would be cheaper, more efficient and would avoid the above-mentioned drawbacks.

SUMMARY OF THE INVENTION

It is therefore an object of the invention to provide a method and system for an automatic allocation of addresses to devices within the network.

According to one aspect of the invention there is provided a method of automatically allocating a unique address to a network device, comprising the steps of:

introducing a set of identifiers associated with the network device, each identifier designating an assignment of the network device to a hierarchical layer of devices in the network and being unique to the layer; and applying a first transformation, which has the inverse transformation, to the set of identifiers, the value of the transformation being the address of the network device.

Conveniently, the step of applying the transformation comprises applying a function, which has the inverse function, e.g. applying a linear function or a non-linear function.

The method is suitable for allocation of the Internet protocol (IP) address to the network device or other known types of the addressing schemes.

Advantageously, the method further comprises the step of arranging the addresses of the devices in the network in a predetermined order, comprising:

communicating the device addresses assigned in the method of claim 1 between the devices that are directly connected to each other by one of the physical and logical link;

for each device, applying an ordering condition to the existing address of the device and the address received from the connected device; and if the condition is satisfied, apply a second transformation having the inverse transformation, to one of the existing and received device addresses to change one of the existing and received addresses so that the network device addresses are unique and arranged in the order defined by the second transformation.

Conveniently, the step of applying the second transformation comprises the step of applying a function. The described method is suitable to provide allocation of the addresses to one or more of the following network devices: network area, node, shelf, card, port and slot, or other devices introduced in accordance with the network hierarchy.

Conveniently, the method is applied to allocation of port addresses in the network, and the step of applying the first transformation comprises applying the transformation whose values are even numbers only. The step of applying the ordering condition comprises applying a logical comparison of the existing and received port addresses, and the ordering condition is satisfied if the existing port address is smaller than the received port address. Then the step of applying the second transformation comprises applying the transformation that re-assigns a new port address instead of the existing port address by assigning an odd number which is smaller than the received port address and greater than the existing port address. Conveniently, the step of re-assigning the new port address comprises assigning the odd number as the port address, the odd number being smaller than the received address by unity.

Beneficially, the step of communicating the device addresses comprises communicating the device addresses according to a network protocol, comprising forming a data structure including the device address and encapsulating the data structure directly in an Open Systems Interconnections (OSI) layer 2 frame. The step of encapsulating the data structure may comprise encapsulating the data structure in one of the following frames: ATM frame, frame-relay frame, Ethernet frame, and the step of communicating the device addresses comprises communicating the addresses between the devices in the network that support Sub-Network Access Protocol (SNAP).

According to another aspect of the invention there is provided a method of transmitting information between directly connected network devices supporting a Sub-Network Access Protocol (SNAP), comprising:

forming a data structure including the information to be transmitted; and encapsulating the data structure directly in an Open Systems Interconnections (OSI) layer 2 frame.

According to yet another aspect of the invention there is provided a system for automatic allocation of a unique address to a network device, comprising:

means for introducing a set of identifiers associated with the network device, each identifier designating an assignment of the network device to a hierarchical layer of devices in the network and being unique to the layer; and means for applying a first transformation, which has the inverse transformation, to the set of identifiers, the value of the transformation being the address of the network device.

Conveniently, the means for applying the transformation comprises means for applying a function, which has the inverse function, e.g. means for applying one of the linear function and non-linear function. Advantageously, the system further comprises a means for arranging the network addresses in a predetermined order, including:

means for communicating the allocated device addresses between the devices that are directly connected to each other by one of the physical and logical link;

at each device, means for applying an ordering condition to the existing address of the device and the address received from the connected device; and means for applying a second transformation having the inverse transformation, if the condition is satisfied, to one of the existing and received device addresses to change one of the existing and received addresses so that the device addresses in the network are unique and arranged in the order defined by the second transformation.

Conveniently, the means for applying the second transformation comprises the means for applying a function.

Beneficially, the means for communicating the device addresses comprises means for communicating the device addresses according to a network protocol, comprising means for forming a data structure including the device address and means for encapsulating the data structure directly in an Open Systems Interconnections (OSI) layer 2 frame, e.g. ATM frame, frame-relay frame, Ethernet frame.

The described method and system have the advantages of providing automatic allocation of addresses to the network devices, it does not require involvement of the operator for the allocation process, it also does not require the address server and/or additional hardware and software to support the process. Additionally, it generates device addresses that are arranged in a predetermined order, e.g. the addresses of the connected ports between two nodes may be sequential. It allows the use of the network resource more efficiently, e.g. to determine addresses of the connected devices by having limited information about the network, e.g. by knowing the address of one of the connected devices only, which otherwise would not be possible.

BRIEF DESCRIPTION OF THE DRAWINGS

Embodiments of the invention will now be described, by way of example, with reference to the accompanying drawings in which.

DETAILED DESCRIPTION OF THE PREFERRED EMBODIMENTS

Figure 1:
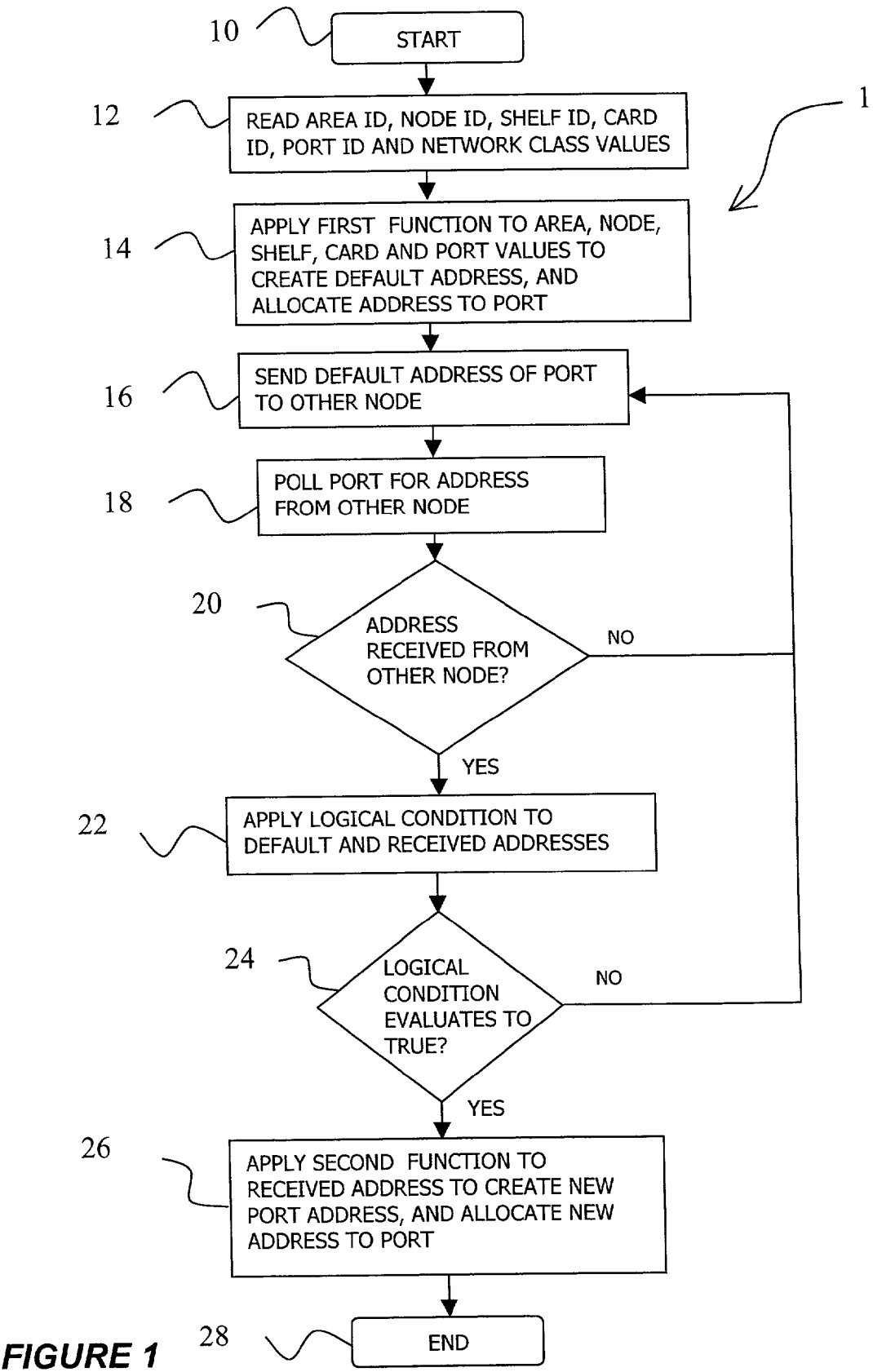
FIG. 1 is flowchart illustrating a method of automatic allocation of port addresses in a network according to a first embodiment of the invention.

A method for automatic allocation of unique addresses to ports of the devices in a network according to a first embodiment of the invention is illustrated in FIG. 1 by flowchart 1. At the start of the method (box 10), a network administrator adds a new device to the network, e.g. a new node, powers up the node, provisions it with various cards, and configures the node with values for an area identifier, node identifier, and with an IP network type class value of "A", "B" or "C". The choice of the network class is performed before the network is created, and prior to the addition of any nodes to the network in function of the number of nodes that will be installed in the network. The definition of Class "A", "B" and "C" networks is given in RFC 791, "INTERNET PROTOCOL, DARPA INTERNET PROGRAM, PROTOCOL SPECIFICATION", published by the Internet Engineering Task Force (IETF), September 1981. A Class "A", or /8 network, is assigned to few networks in the Internet, where the network is requires up to $2^{24}$ nodes. Class "B" networks are medium size, allowing up to $2^{16}$ nodes, and Class "C" networks are small size networks, allowing up to 254 nodes.

Each network device has a set of identifiers, wherein each identifier designates an assignment of the device to a hierarchical layer of devices in the network and is unique to the layer. The hierarchical layers of the network devices may be conveniently introduced in the following manner. The highest level in the network hierarchy is the area, where the network is grouped into one or more areas, each with an area identifier that is unique in the network. The next level in the hierarchy is the node, where each area is comprised of one or more nodes, and each node has an identifier that is unique within the area. Each node is comprised of a number of shelves, each shelf is comprised of a number of cards, and each card is comprised of a number of ports. Each port has an identifier that is unique to the card, each card has an identifier that is unique within the shelf, and each shelf has a unique identifier, which is unique within the node. Each port, therefore, has identifiers for the associated area, node, shelf, card and port, and the combined set of these identifiers is unique within the network. The identifiers are stored in a memory in the network node. During the initialization phase when the node is powered up, a computer program or processing circuitry (not shown) at the node reads the identifier values associated with the area and node, and the value of the network class (box 12). The processing circuitry or the corresponding software at the node performs a self-examination of the node to determine all provisioned shelves and cards, and further reads the shelf number for each shelf, the card number of each card in each shelf, and the port number in each card in each shelf.

To allocate a unique default address to each port on each card and each shelf, the processing circuitry processes the above-assigned identifiers, namely the area, node, shelf, card and port identifiers, by applying a first function to the identifiers (box 14). The applied function is chosen so that to allow for the inverse function, i.e. the function provides one-to-one correspondence between its argument and the value of the function, and the value of the function for each argument is different, i.e. unique. Thus, the unique address assigned to the port of the network device is the value of the function. In the first embodiment of the invention, the function is designed so as to provide allocation of Internet Protocol (IP) addresses. To comply with the IP standards, the address has to be in the form of four numbers separated by a period W.X.Y.Z, i.e. in the form of first, second, third and fourth octets W,X,Y and Z respectively. Each of the four numbers/octets has a maximal decimal value of 255, since each value is held in an eight-bit byte. For a large class "A" network, with a maximum of 16 areas per network, 16 nodes per area, 64 shelves per node, 16 cards per shelf and 16 ports per card, the values of the four octets that compose the port address will be calculated by the function shown in Table 1. The function uses the present area ID number and present node ID number, as configured by the operator, and the shelf, card and port numbers of each port.

TABLE 1

| First octet | Second octet | Third octet | Fourth octet |
|---|---|---|---|
| 10 | (16 * A) + N | 4 * (S + [C/4]) | 64 * (C − (4 * [C/4])) + (4 * P) + 2 |

In Table 1, the notation [J] means the integer value of J, so that, for example, [0.1] is equivalent to the value 0, [1.6] is equivalent to the value 1, [9/4] is equivalent to the value 2, and so on. In Table 1, the symbol "A" refers to the area ID number, "N" refers to the node ID number, "S" refers to the shelf ID number, "C" refers to the card ID number, and "P" refers to the port ID number, and all values start at zero.

The function is chosen so that the first octet is equal to 10 according to the definition of IP class type "A", and the five identifiers associated with the area, node, shelf, card and port can be held in the second, third and fourth octets of the port address. Due to the property of the function to be reversible, conveniently the earlier introduced identifiers can be determined from a port address if, e.g. the port address is available only. Given a port address in the form 10.X.Y.Z generated by the formula in Table 1, the following reverse formulae can be used to determine the area, node, shelf, card and port values:

A=[X/16]
N=X−[X/16]*16
S=[Y/4]
C=[Z/64]+4*(Y−[Y/4]*4)
P=(Z−[Z/64]*64−2)/4

After performing the computation of the default IP port address for each port (box 14), the node assigns the default address to the port, and adds an entry to a table in the memory that maps the shelf, card and port number to the default IP address.

The next step of the method is to negotiate the IP addresses between network nodes in order to arrange the allocated port addresses in a predetermined order, including if necessary re-assignment of the previously allocated addresses.

In the first embodiment of the invention it is chosen to arrange the port addresses so that the addresses of the ports that form endpoints of a physical or logical link are sequential. The negotiations are performed for the devices in the network which support sub-network access protocol (SNAP), see e.g. ANSI/IEEE Std 802.2, 1998 Edition (ISO/IEC 8802-2:1998) IEEE Standard for Information technology, Telecommunications and information exchange between systems, Local and metropolitan area networks, Specific requirements Part 2: Logical Link Control, (www.ieee.org). After the default address has been allocated to the port at the node (box 14), the node creates a frame, including its port address, in the first embodiment the frame being an Ethernet frame. The content and structure of the frame will be described in more detail below. The node sends the frame (the sent frame) to the connected port on the other node. The node polls the port for a frame from the other node containing the IP address of the connected port, the received frame, (box 18), waiting for a suitable time period as configured by the administrator and read by the node at power-up (box 12). If the frame including the received address from the other node is not received on the port, the node continues to send the sent frame (box 16) and continues to poll the port for the received frame (box 18) within the configured time period repeatedly, until the received frame is received on the port.

If the received frame having the received IP address is received (box 20) within the time period, the port is considered to be a link endpoint, connected by a physical or logical link directly to another link endpoint on another node. The node examines the received frame, and applies a logical condition to the existing (default) and received port address to compare the addresses (box 22). If the value of the received node ID is greater than that of the present node (box 24), the node determines a new address for the present port instead of the existing address by applying a second function which has the inverse function to the received address, e.g. decrementing the octet 4 of the received address by a value of one (box 26), after which the method is terminated (box 28). Such an allocation of the port addresses ensures that the addresses of 0.5 the ports that form the link endpoints are sequential. The node also adds the value to the port mapping table that maps the shelf, card and port number to the default port address and to the newly allocated port address.

Thus, automatic allocation of port addresses and the negotiation of addresses between the nodes in the network, using the method of FIG. 1, is provided.

Figure 2A:
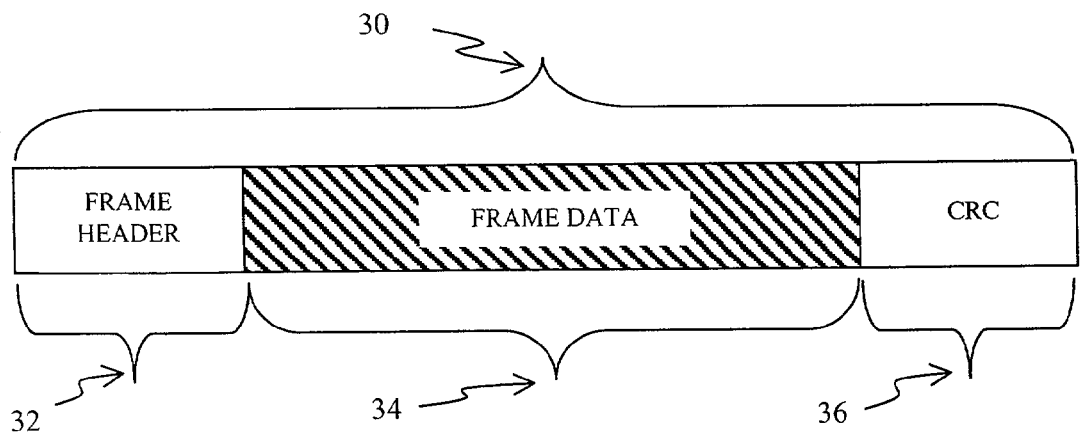
FIG. 2A illustrates structure of a frame used for the exchange of network information in the method of FIG. 1.
Figure 2B:
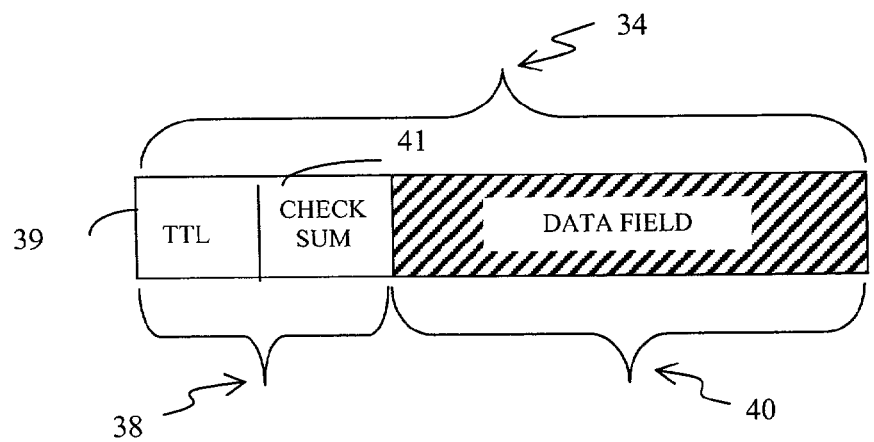
FIG. 2B illustrates structure of the frame data field of the frame of FIG. 2A.
Figure 2C:
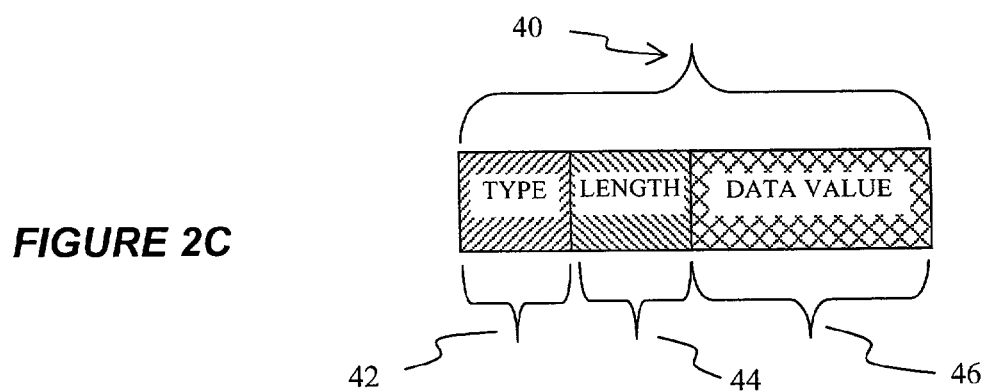
FIG. 2C illustrates structure of the data field of the frame data field of FIG. 2B.
Figure 3:
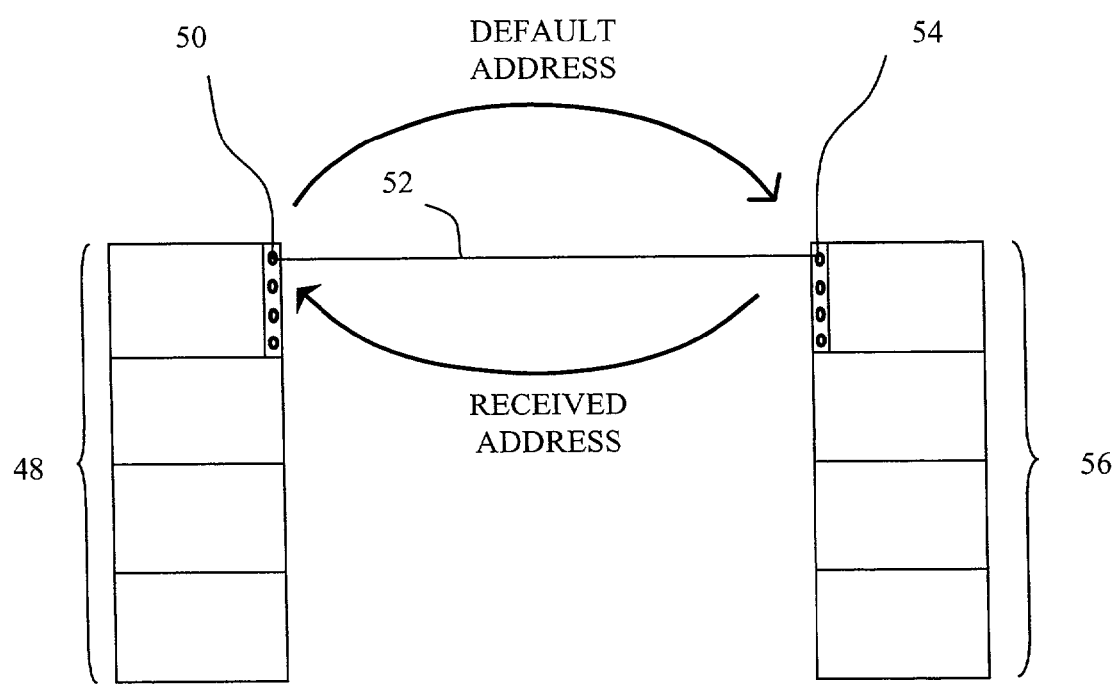
FIG. 3 is a diagram illustrating the exchange of port addresses between the nodes, according to the steps 16, 20 and 26 of the method of FIG. 1.

FIGS. 2 and 3 illustrate a process of negotiation of port addresses described in boxes 16, 20 and 26 of FIG. 1 and a network protocol therefor, the negotiations being performed by nodes that support Sub-network Access Protocol (SNAP).

FIGS. 2A, 2B and 2C show the format of the data structure sent between the nodes to negotiate the port addresses, according to the steps 16, 20 and 26 of the method of FIG. 1. FIG. 2A shows the structure of the frame 30 used for the exchange of network information in the method of FIG. 1. The frame 30 has a frame header field 32 containing general information about the sent data, frame data filed 34 and a cyclic redundancy check field 36. FIG. 2B shows the structure of the frame data filed 34 of the frame of FIG. 2A. The frame data field 34 is comprised of a header field 38 of four bytes, comprising a time-to-live value of two bytes field 39 and a checksum field 41 of two bytes, followed by a data field part 40. FIG. 2C shows the structure of the data field 40 of the frame data field 34 of FIG. 2B. The data field 40 is in the form of a type-length-value (TLV) structure, and is comprised of a type field 42 of two bytes that indicates whether the data value part is a node identifier, a port address or another TLV structure, a length field 44 of two bytes which indicates the length of the data value field, and a data value field 46 containing the value for the type mentioned in field 42. Generally, the data field 40 may include one or more TLV structures one after the other.

Thus, the process of the exchange of information about port addresses in the network described above, defines an Open Systems Interconnections (OSI) layer 2 protocol, which is independent of higher layer protocols (i.e. layer 3 and up) and can be run before any high layer protocols are established. Accordingly, the frame 30 encapsulates the data value 40 directly into the OSI layer 2 frame that supports Sub-network Access Network Protocol (SNAP). The standards for the OSI layers are developed by International Organization for Standardization (www.osi.org) and can be found in the document # 35.100.

FIG. 3 is a diagram illustrating the exchange of port addresses between two nodes, according to the steps 16, 20 and 26 of the method of FIG. 1 in more detail. The node 48 sends the sent frame containing the default (existing) port address 50 across the link 52 to the connected port 54 on the other node 56. The node 48 polls the port 50 to determine if the received frame is received from the other node 56. If the received frame is received, the node 48 applies a logical condition to determine if the default port address is to be re-calculated. If the applied condition is true, the node 48 applies a function to the received port address to determine a new port address. Similar to the above, the function has a property of being reversible.

Thus, a method and system for automatic allocation of port addresses in a network and a network protocol therefor are provided.

Below are shown several examples illustrating allocation of addresses and negotiation for IP addresses between the two nodes in a class "A" IP network using the method described above.

The first example shown in Table 2, illustrates IP address allocation in a network having four nodes, numbered from 1 to 4, all in the same area with then area ID number of 1. Table 2 shows the identifiers for the node "N", shelf "S", card "C" and port "P", and shows the default port addresses determined in accordance with the function of Table 1.

TABLE 2

| N | S | C | P | IP address |
|---|---|---|---|---|
| 1 | 1 | 2 | 2 | 10.1.4.138 |
| 1 | 1 | 2 | 1 | 10.1.4.134 |
| 2 | 1 | 2 | 2 | 10.2.4.138 |
| 2 | 1 | 2 | 1 | 10.2.4.134 |
| 3 | 1 | 2 | 2 | 10.3.4.138 |
| 3 | 1 | 2 | 1 | 10.3.4.134 |
| 4 | 1 | 2 | 2 | 10.4.4.138 |
| 4 | 1 | 2 | 1 | 10.4.4.134 |

Figure 4:
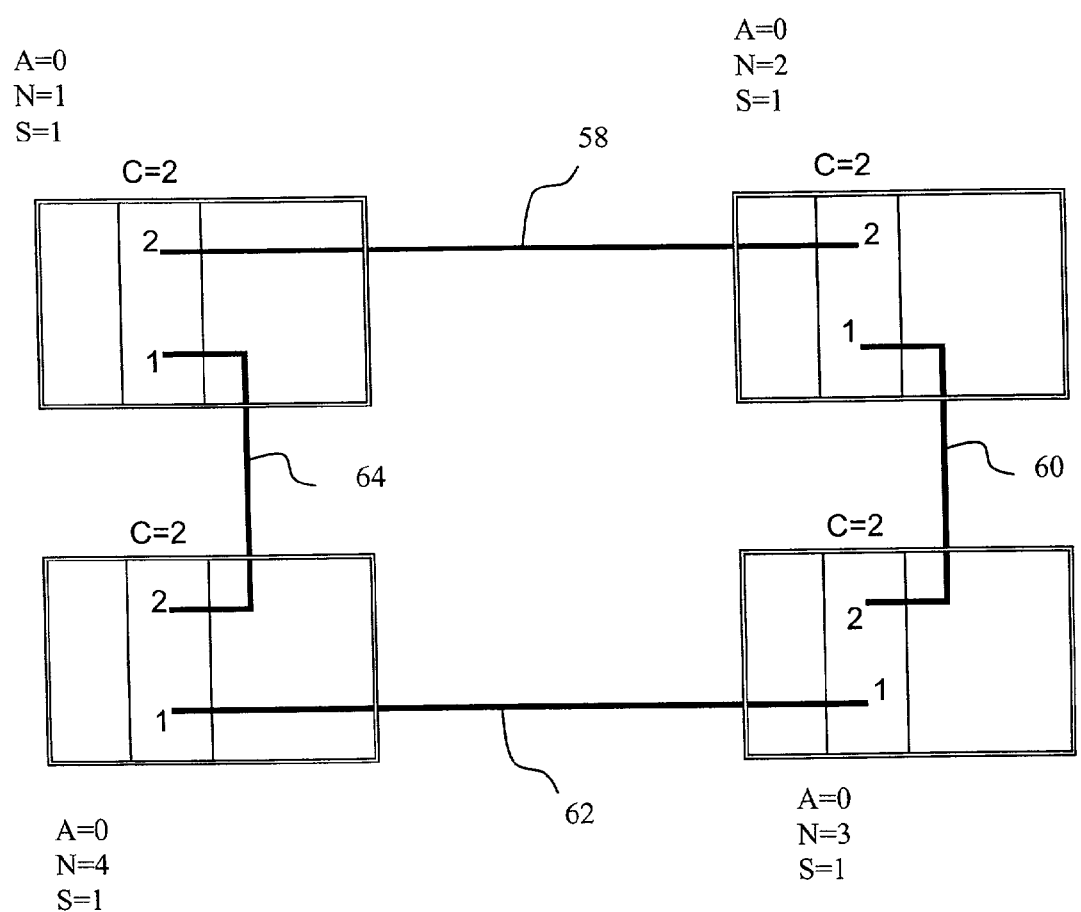
FIG. 4 is an exemplary diagram showing allocation of IP port addresses for a four node network illustrated in Tables 2 to 4.

Table 3 illustrates exemplary connections between the network ports, also illustrated in FIG. 4. For example, link 58 connects port 2 on card 2 of shelf 1 of node 1 to port 2 of card 2 of shelf 1 on node 2. Similarly, link 60 connects port 1 on card 2 of shelf 1 on node 2 to port 2 on card 2 of shelf 1 on node 3. Connection provided by links 62 and 64 can be similarly defined from Table 3 and FIG. 4.

TABLE 3

| Link in | Port | | | | Connected port | | | |
|---|---|---|---|---|---|---|---|---|
| FIG. 4 | N | S | C | P | N | S | C | P |
| 58 | 1 | 1 | 2 | 2 | 2 | 1 | 2 | 2 |
| 60 | 2 | 1 | 2 | 1 | 3 | 1 | 2 | 2 |
| 62 | 3 | 1 | 2 | 1 | 4 | 1 | 2 | 1 |
| 64 | 4 | 1 | 2 | 2 | 1 | 1 | 2 | 1 |

After the connection between the ports at different nodes is provided and negotiation process is completed as described above, the newly allocated address for the four node network of the first example of Table 2 are shown in Table 4.

TABLE 4

| N | S | C | P | IP address |
|---|---|---|---|---|
| 1 | 1 | 2 | 2 | 10.2.4.137 |
| 1 | 1 | 2 | 1 | 10.4.4.137 |
| 2 | 1 | 2 | 2 | 10.2.4.138 |
| 2 | 1 | 2 | 1 | 10.3.4.137 |
| 3 | 1 | 2 | 2 | 10.3.4.138 |
| 3 | 1 | 2 | 1 | 10.4.4.133 |
| 4 | 1 | 2 | 2 | 10.4.4.138 |
| 4 | 1 | 2 | 1 | 10.4.4.134 |

A second embodiment of the invention provides a method for automatic allocation of the port addresses for a medium size Class "B" IP network, or /16 network. Such a network has maximum 16 areas per network, 32 nodes per area, 64 shelves per node, 16 cards per shelf and 16 links per card. The method of the second embodiment is similar to that of the first embodiment except for the function used to determine the port addresses. The function suitable for the Class "B" network and used in the second embodiment is shown in Table 5.

TABLE 5

| First octet | Second octet | Third octet | Fourth octet |
|---|---|---|---|
| 172 | 16 + (2 * A) + [N/8] | 32(N − 8 * [N/8]) + S − 32 * [S/32] | 128 * [S/32] + 16 * C + 4 * P + 2 |

A third embodiment of the invention provides a method for automatic allocation of the port addresses for a for a small size Class "C" IP network, or /24 network. Such a network supports maximum 8 areas per network, 16 nodes per area, 8 shelves per node, 3 cards per shelf and 3 links per card. The method of the third embodiment is similar to that of the first and second embodiments except for the function used to determine the port addresses. The function suitable for the Class "C" network and used in the third embodiment is shown in Table 6.

TABLE 6

| First octet | Second octet | Third octet | Fourth octet |
|---|---|---|---|
| 192 | 168 | 32 * A + 2 * N + [S/4] | 64 * (S − 4 * [S/4]) + 16 * C + 4 * P + 2 |

A fourth embodiment of the invention provides a method of automatic allocation of port addresses in a network that conforms to implementations of Internet Engineering Task Force (IETF) RFC 3021 "Using 31-Bit Prefixes on IPV4 Point-to-Point Links", (December 2000). The method of the fourth embodiment is suitable to any class of network, which has a maximum 16 areas per network, 32 nodes per area, 64 shelves per node, 16 cards per shelf and 16 links per card. In this embodiment, the port addresses are determined by applying the function shown in Table 7.

TABLE 7

| First octet | Second octet | Third octet | Fourth octet |
|---|---|---|---|
| 10 | (16 * A) + [N/2] | 128 * (N − (2 * [N/2])) + (2 * S) + [C/8] | 32 * (C − (8 * [C/8])) + (2 * P) + 1 |

This will allow a support a maximum of 512 nodes in a network and up to 16384 network links per node.

The described method and system of the embodiments of the invention have the advantages that the address generation is automatic, it requires neither involvement of the operator nor the address server and/or additional hardware and software to support the process. Additionally, it generates address values that are not random and arranged in a predetermined order, and the addresses of the connected ports between two nodes are sequential. It also allows determining the addresses of the connected ports by having limited information about the network, e.g. by knowing the address of one of the connected port only, which otherwise would not be possible.

Numerous modifications can be made to the embodiments described above. For example, the process of re-assigning the port addresses during the negotiation step between the nodes of the method can be changed, e.g. the node may determine a new address for the present port by assigning an odd-numbered address which is lower than the received address but higher than the default address. This enables the formula to be used in networks other than IP networks.

While the embodiments of the invention have been described with regard to the allocation of port addresses, it is understood that the invented method and system are also applicable to allocation of addresses to other elements in the network, e.g. to area, node, shelf, card, port, slot, or other devices introduced in the network hierarchy.

Another modification to the described method is to use another function to allocate the port address, e.g. another linear or non-linear function which is reversible. Yet another modification to the method is to replace the function with a mathematical transformation, e.g. integral or derivative transformation which is also a reversible transformation. These variations allow the method to be used with a variety of OSI layer 3 network protocols in addition to the Internet Protocol.

It is also contemplated that the network hierarchy (and accordingly the network device identifiers) may be comprised of more or less the hierarchical layers than areas, nodes, shelves, cards and ports as long as the device in the hierarchical layer has the identifier that is unique to the layer.

Additionally, the data structure of the data field 40 of the frame 30 used in the negotiations protocol of the method can be modified, e.g. the TLV data field 40 of FIG. 2C can be simplified by dropping the Length field 44 and using the Type field 42 and the Data value field 46 only.

Although in the first embodiment the exchange of information between the network devices has been done by using Ethernet frames, it is contemplated that in a modification to the embodiments, the TLV Data field 40 can be created with similar information to be used in ATM, Frame Relay frames or other types of frames suitable for the network protocol supporting negotiations between the devices.

Although the embodiments of the invention have been described with regard to the to Internet Protocol addressing, it is understood that the invented method can be also applied to other network addressing schemes.

Although specific embodiments of the invention have been described in detail, it will be apparent to one skilled in the art that variations and modifications to the embodiments may be made within the scope of the following claims.

What is claimed is:

1. A method of automatically allocating a unique address to a network device, comprising the steps of:
   introducing a set of identifiers associated with the network device, each identifier designating an assignment of the network device to a hierarchical layer of devices in the network and being unique to the layer;
   applying a first transformation, which has the inverse transformation, to the set of identifiers, the value of the transformation being the address of the network device,
   the method further comprising the step of arranging the addresses of the devices in the network in a predetermined order, comprising:
   communicating the device addresses assigned between the devices that are directly connected to each other by one of the physical and logical link;
   for each device, applying an ordering condition to the address received existing address of the device and the from the connected device; and
   if the condition is satisfied, apply a second transformation having the inverse transformation, to one of the existing and received device addresses to change one of the existing and received addresses so that the network device addresses are unique and arranged in the order defined by the second transformation.

2. A method as described in claim 1, wherein the step of applying the second transformation comprises the step of applying a function.

3. A method as described in claim 1, the method providing allocation of the addresses to one or more of the following network devices: network area, node, shelf, card, port and slot.

4. A method as described in claim 3, wherein the method provides allocation of port addresses in the network and wherein the step of applying the first transformation comprises applying the transformation whose values are even numbers only.

5. A method as described in claim 4, wherein the step of applying the ordering condition comprises applying a logical comparison of the existing the received port addresses.

6. A method as described in claim 5, wherein the ordering condition is satisfied if the existing port address is smaller than the received port address, and the step of applying the second transformation comprises applying the transformation that reassigns a new port address instead of the existing port address by assigning an odd number which is smaller than the received port address and greater than the existing port address.

7. A method as described in claim 6, wherein the step of the re-assigning the new port address comprises assigning the odd number as the port address, the odd number being smaller than the received address by unity.

8. A method as described in claim 1, wherein the step of communicating the device addresses comprises communicating the device addresses according to a network protocol, comprising forming a data structure including the device address and encapsulating the data structure directly in an Open Systems Interconnections (OSI) layer 2 frame.

9. A method as described in claim 8, wherein the step of encapsulating the data structure comprises encapsulating the data structure in one of the following frames: ATM frame, frame relay frame, Ethernet frame.

10. A method as described in claim 8, wherein the step of communicating the device addresses comprises communicating the addresses between the devices in the network that support Sub-Network Access Protocol (SNAP).

11. A method as described in claim 1, wherein the step of applying the transformation comprises applying a function, which has the inverse function.

12. A method as described in claim 11, wherein the step of applying the function comprises applying a linear function.

13. A method as described in claim 11, wherein the step of applying the function comprises applying a non-linear function.

14. A method as described in claim 1, the method providing allocation of the Internet protocol (IP) address to the network device.

15. A system for of automatic allocation of a unique address to a network device, comprising:

means for introducing a set of identifiers associated with the network device, each identifier designating an assignment of the network device to a hierarchical layer of devices in the network and being unique to the layer;

means for applying a first transformation, which has the inverse transformation, to the set of identifiers, the value of the transformation being the address of the network device;

the system further comprising a means for arranging the network addresses in a predetermined order, comprising:

means for communicating the allocated device addresses between the devices that are directly connected to each other by one of the physical and logical link;

at each device, means for applying an ordering condition to the existing address of the device and the address received from the connected device; and means for applying a second transformation having the inverse transformation, if the condition is satisfied, to one of the existing and received device addresses to change one of the existing and received addresses so that the device addresses in the network are unique and arranged in the order defined by the second transformation.

16. A system as described in claim 15, wherein the means for applying the second transformation comprises the means for applying a function.

17. A system as described in claim 15, wherein the means for communicating the device addresses comprises means for communicating the device addresses according to a network protocol, comprising means for forming a data structure including the device address, and means for encapsulating the data structure directly in an Open Systems Interconnections (OSI) layer 2 frame.

18. A system as described in claim 17, wherein the means for encapsulating the data structure comprises means for encapsulating the data structure in one of the following frames: ATM frame, frame-relay frame, Ethernet frame.

19. A system as described in claim 15, wherein the means for applying the transformation comprises means for applying a function, which has the inverse function.

20. A system as described in claim 19, wherein the means for applying the function comprises mean: for applying one of the linear function and non-linear function.

* * * * *

UNITED STATES PATENT AND TRADEMARK OFFICE
CERTIFICATE OF CORRECTION

PATENT NO.         : 7,000,029 B2                                    Page 1 of 1
APPLICATION NO. : 10/023758
DATED              : February 14, 2006
INVENTOR(S)        : Constantin Viorel Marian et al.

It is certified that error appears in the above-identified patent and that said Letters Patent is hereby corrected as shown below:

Column 10, lines 50, cancel the text beginning with "for each device" to and ending "from the connected device; and" in line 53, insert the following:

-- for each device, applying an ordering condition to an existing address of the device and an address received from the connected device; and --.

Column 11, line 6, after "comparison" delete "of the" and insert -- to --.

Column 11, line 6, after "existing" delete "the" and insert -- and --.

Column 11, line 11, "reassigns" is corrected to read as -- re-assigns --.

Column 11, line 45, after "A system for" delete "of".

Column 12, line 43, "mean" is corrected to read as -- means --.

Signed and Sealed this

Thirteenth Day of July, 2010

David J. Kappos
*Director of the United States Patent and Trademark Office*